(12) United States Patent
Kawai et al.

(10) Patent No.: US 6,513,073 B1
(45) Date of Patent: Jan. 28, 2003

(54) DATA OUTPUT METHOD AND APPARATUS HAVING STORED PARAMETERS

(75) Inventors: Sunao Kawai; Keiji Miyake, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/239,145

(22) Filed: Jan. 28, 1999

(30) Foreign Application Priority Data

Jan. 30, 1998 (JP) .......................................... 10-019763
Feb. 26, 1998 (JP) .......................................... 10-045938

(51) Int. Cl.$^7$ ................................................ G06F 3/00
(52) U.S. Cl. ............................... 710/1; 710/15; 710/52; 710/65; 710/105; 710/268
(58) Field of Search .......................... 710/1, 5, 20, 104, 710/105, 4, 3, 12, 36, 65, 7, 15, 13, 52, 54, 268; 704/258, 261

(56) References Cited

U.S. PATENT DOCUMENTS

| | | | | |
|---|---|---|---|---|
| 5,255,200 A | * | 10/1993 | Torizawa et al. | 360/180 |
| 5,305,433 A | * | 4/1994 | Ohno | 395/150 |
| 5,528,726 A | * | 6/1996 | Cook | 704/261 |
| 5,655,114 A | * | 8/1997 | Taniai et al. | 712/233 |
| 5,666,108 A | * | 9/1997 | Duffy | 340/870.03 |
| 5,719,761 A | * | 2/1998 | Gatti et al. | 700/1 |
| 5,732,161 A | * | 3/1998 | Kuroda et al. | 382/284 |
| 5,781,128 A | * | 7/1998 | Shlomot | 341/51 |
| 5,825,645 A | * | 10/1998 | Konar et al. | 700/28 |
| 5,828,818 A | * | 10/1998 | Anzai | 358/1.58 |
| 6,088,665 A | * | 7/2000 | Burns et al. | 702/188 |
| 6,115,686 A | * | 9/2000 | Chung et al. | 704/258 |
| 6,414,722 B1 | | 7/2002 | Bramley | 348/565 |

* cited by examiner

Primary Examiner—Jeffrey Gaffin
Assistant Examiner—Rijue Mai
(74) Attorney, Agent, or Firm—Oliff & Berridge, PLC

(57) ABSTRACT

A data output apparatus includes: a storage device in which a first storage area is formed in advance; a first receiving device for receiving a parameter set for setting a condition of the output process, and storing the received parameter set into the first storage area; a forming device for forming a second storage area in the storage device, and linking the formed second storage area with the received parameter set; a second receiving device for receiving a data set, and storing the received data set into the second storage area; a processing device for identifying the parameter set linked with the second area in which the received data set is stored, setting the condition of the output process according to the identified parameter set, and processing the received data set according to the output process whose condition is set by the identified parameter set; and an output device for outputting the processed data set.

28 Claims, 12 Drawing Sheets

FIG.12

| | |
|---|---|
| PAPER SIZE : | A4 |
| COLOR EDIT : | COLOR PROFILE |
| SCALE : | 200% |
| SCREENING : | ERROR DIFFUSION |
| PREVIEW DISPLAY : | ON |

DATA OUTPUT METHOD AND APPARATUS HAVING STORED PARAMETERS

BACKGROUND OF THE INVENTION

1. Field of the Invention

The present invention relates to a data output apparatus and a data output method for print, display and tabular-outputting data input from external sources, such as a document, an image and a numeric value.

2. Description of the Related Art

If, for example, a display and a printer are connected to a computer such as a personal computer and an application software with a word processing function and a drawing function is executed on the personal computer, then document data or image data can be generated by the personal computer, displayed on a display portion and printed on a paper sheet.

In addition, if executing an application software with an operational function and a tabular function on the personal computer, a table or a graph can be generated based on numeric data input into the computer, displayed on the display portion and printed on a paper sheet.

The document data or image data thus generated by the application software with the word processing function or the drawing function may be created in a data format specific to the application software. In this case, it is required to re-execute the application software, by which the document data or the image data was generated, and to utilize the display function or the print function of the application software in order to display or print the document or image data.

There are actually various types of application software with word processing functions or a drawing functions, so are various types of document data or image data formats. Due to this, if document data or image data which has been generated by an application software different in type from that can be executed on a user's personal computer, it sometimes may not be able to be displayed or printed using the computer, which causes inconvenience to the user involved.

Further, it is often necessary to set a paper size and a printing method and the like every time the document data or image data is printed using an application software with a word processing function or a drawing function, which results in complicated print operation.

The inconvenience and complicated print operation are also the case with generating and outputting a table or a graph using an application software having an operation function or a tabular function.

SUMMARY OF THE INVENTION

It is therefore an object of the present invention to provide a data output apparatus and a data output method capable of comprehensively conducting output process such as display, print and tabular output to data set including, for example, document data and image data, without need of executing the application software corresponding to their individual data formats.

The aforementioned object can be achieved by a data output apparatus according to the present invention. The data output apparatus is an apparatus for receiving a data set input from an external source, processing the data set according to an output process, and outputting the processed data set. The data set includes, for example, character data, image data and numeric data. The output process includes, for example, conversion of data formats, conversion of data arrangements, calculation for data processing, and addition of other data. The output process is, for example, a printing process, a displaying process, a transmitting process and a tabular-outputting process.

The apparatus of the present invention has: a storage device in which a first storage area is formed in advance; a first receiving device for receiving a parameter set for setting a condition of the output process, and storing the received parameter set into the first storage area; a forming device for forming a second storage area in the storage device, and linking the formed second storage area with the received parameter set; a second receiving device for receiving the data set, and storing the received data set into the second storage area; a processing device for identifying the parameter set linked with the second area in which the received data set is stored, setting the condition of the output process according to the identified parameter set, and processing the received data set according to the output process whose condition is set by the identified parameter set; and an output device for outputting the processed data set.

The parameter set includes parameters for setting a condition of the output process. For example, if the output process is a printing process, the parameter set includes parameters representing: printing types, print positions, sheet sizes and the like. If the output process is a displaying process, the parameter set includes parameters representing: display types, display positions, display sizes and the like. If the output process is a transmitting process, the parameter set includes parameters representing: addresses for transmitting data, transmission speeds and the like. If the output process is a tabular-outputting process, the parameter set includes parameters representing: functions for calculation, display positions of tabular-data and the like.

In operation, the first receiving device receives a parameter set and stores it into the first storage area of the storage device. When the parameter set is received, the forming device forms the second storage area in the storage device, and links it with the received parameter set. If several different parameter sets are received, the forming device forms the several different second storage areas in the storage device, and links them with the received parameter sets, respectively. That is, the forming device adds the second storage area in the storage device one after another, whenever the different parameter set is received. After the second storage area is formed, the second receiving device can receive the data set. When the data set is sent from an external source to the data output apparatus, the second receiving device receives it, and stores it into the second storage device. Then, the processing device searches the first storage area for the parameter set linked with the second storage area in which the received data set is stored, and identifies the parameter set linked with this second storage area. Then, the processing device sets the condition of the output process according to the identified parameter set, and process the data set according to the output process. Next, the output device outputs the processed data set. For example, if the output process is a printing process, the output device prints out the processed data set. If the output process is a transmitting process, the output device transmits the processed data set.

As can be understood from the above, according to the data output apparatus of the present invention, the user firstly inputs the parameter set into the first storage area of the data output apparatus. As a result, the second storage area is formed in the data output apparatus. The user secondly inputs the data set into this second storage area. As a result, the data set is processed according to the output process whose condition is set by the parameter set input by the user.

Thus, if the user only input the parameter set and the data set to the data output apparatus, the data set is processed and output automatically. Therefore, an application soft ware for processing the data set is not required. Furthermore, if the user inputs one parameter set and several or a large number of data sets, continuously or simultaneously, the several or a large number of data sets are continuously processed and output by using the same parameter set. Therefore, the several or large number of data sets can be easily and comprehensively processed and output. Moreover, if the data output apparatus has format conversion functions, data sets having various different formats can be processed and output in such a easy operation.

The data output apparatus may further include a determining device for determining whether or not the first receiving device receives the parameter set. In this case, when the determining device determines that the first receiving device receives the parameter set, the forming device forms the second storage area and links the formed second storage area with the received parameter set. Therefore, the user feels that the second storage area can be easily formed only by input of the parameter set.

Furthermore, the data output apparatus may further include another determining device for determining whether or not the second receiving device receives the data set. In this case, when the determining device determines that the second receiving device receives the data set, the processing device identifies the parameter set, sets the condition of the output process, and processes the received and stored data set, and the output device outputs the processed data set. Therefore, the user feels that the data set can be easily processed and output only by input of the data set.

Moreover, the forming device may include a link data generating device for generating link data representing a linkage between the parameter set and the second storage area, and storing the generated link data into the storage device. In this case, the processing device can easily identify the parameter set by referring to the generated link data.

Moreover, the data output apparatus may further include a message output device for outputting a message when the parameter set that has been now received by the first receiving device is the same as the parameter set that has been previously received by the first receiving device. The parameter set that is the same as one that has been previously received is not required. Therefore, if such a parameter set is received, the message output device outputs a message to inform the user of this fact. Accordingly, it can be prevented that the second storage area is double formed in the storage device.

Moreover, the data output apparatus may further include a text data generating device for generating text data representing the content of the parameter set received by the first receiving device, and storing the generated text data into the storage device. Therefore, the user can easily view the text data by using a text editor, a word processing software or the like, so that user can easily confirm the parameters included in the parameter set.

Moreover, the data output apparatus may further include a transferring device for transferring the data set from the second storage area to a third storage area which is formed in advance in the storage device, when the data set has been output by the output device. Therefore, the data set that has not been processed yet and the data set that has been already processed can be easily discriminated.

Moreover, the data output apparatus may further include a deleting device for deleting the data set stored in the third storage area, when a predetermined period of time has passed since the data set was transferred to the third storage area. Therefore, it is possible to prevent that the third storage area is filled with useless data set. The deleting device deletes the data set after waiting a predetermined period of time, so that it can be prevented to delete useful data set.

The aforementioned object can be also achieved by another data output apparatus in accordance with the preset invention. The data output apparatus includes: a storage device having a storage area; a receiving device for receiving the data set and a parameter set for setting a condition of the output process, and storing the received data set and the received parameter set into the storage area; a managing device for managing the received data set and the receiving parameter set such that the received data set and the receiving parameter set are linked with each other; a processing device for identifying the received parameter set linked with the received data set, setting the condition of the output process according to the identified parameter set, and processing the received data set according to the output process whose condition is set by the identified parameter set; and an output device for outputting the processed data set.

In this data output apparatus, the receiving device receives both the data set and a parameter set and stores both the received data set and the received parameter set into the common storage area. The managing device manages the received data set and the receiving parameter set such that the received data set and the receiving parameter set are linked with each other. The processing device identifies the received parameter set linked with the received data set, sets the condition of the output process according to the identified parameter set, and processes the received data set according to the output process. The output device outputs the processed data set.

According to this data output apparatus of the present invention, if the user only inputs the parameter set and the data set into the single storage area, the data set is automatically processed according to the output process whose condition is set by the parameter set. Therefore, an application soft ware for processing the data set is not required.

In this data output apparatus, the processing device may set the condition of the output process according to a default parameter set which is pre-stored in the storage device, when the processing device fails in identifying the parameter set. Therefore, the receiving device receives only the data set, the data set is processed by using the default parameter.

The above-mentioned object can be also achieved by a data output method in accordance with the present invention. The data output method is a method of receiving a data set input from an external source, processing the data set according to an output process, and outputting the processed data set. The data output method has the processes of: receiving a parameter set for setting a condition of the output process, and storing the received parameter set into a first storage area formed in advance in a storage device; forming a second storage area in the storage device, and linking the formed second storage area with the received parameter set; receiving the data set, and storing the received data set into the second storage area; identifying the parameter set linked with the second area in which the received data set is stored, setting the condition of the output process according to the identified parameter set, and processing the received data set according to the output process whose condition is set by the identified parameter set; and outputting the processed data set. Therefore, by using this method, it is possible to comprehensively conduct the output process to the data sets without need of executing the application software corresponding to their individual data formats.

The aforementioned object can be further achieved by another data output method in accordance with the present invention. The data output method is a method of receiving a data set input from an external source, processing the data set according to an output process, and outputting the processed data set. The data output method has the processes of: receiving the data set and a parameter set for setting a condition of the output process, and storing the received data set and the received parameter set into a storage area of a storage device; managing the received data set and the receiving parameter set such that the received data set and the receiving parameter set are linked with each other; identifying the received parameter set linked with the received data set, setting the condition of the output process according to the identified parameter set, and processing the received data set according to the output process whose condition is set by the identified parameter set; and outputting the processed data set. Therefore, by using this method, it is possible to comprehensively conduct the output process to the data sets without need of executing the application software corresponding to their individual data formats.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 12 is a view showing an example of a set of print parameters according to the second embodiment of the present invention.

DETAILED DESCRIPTION OF THE PREFERRED EMBODIMENTS

I. First Embodiment

The first embodiment according to the present invention will now be described with reference to the accompanying drawings. In this embodiment, description will be given, while taking a case of applying the present invention to a print system as an example.

Figure 1:
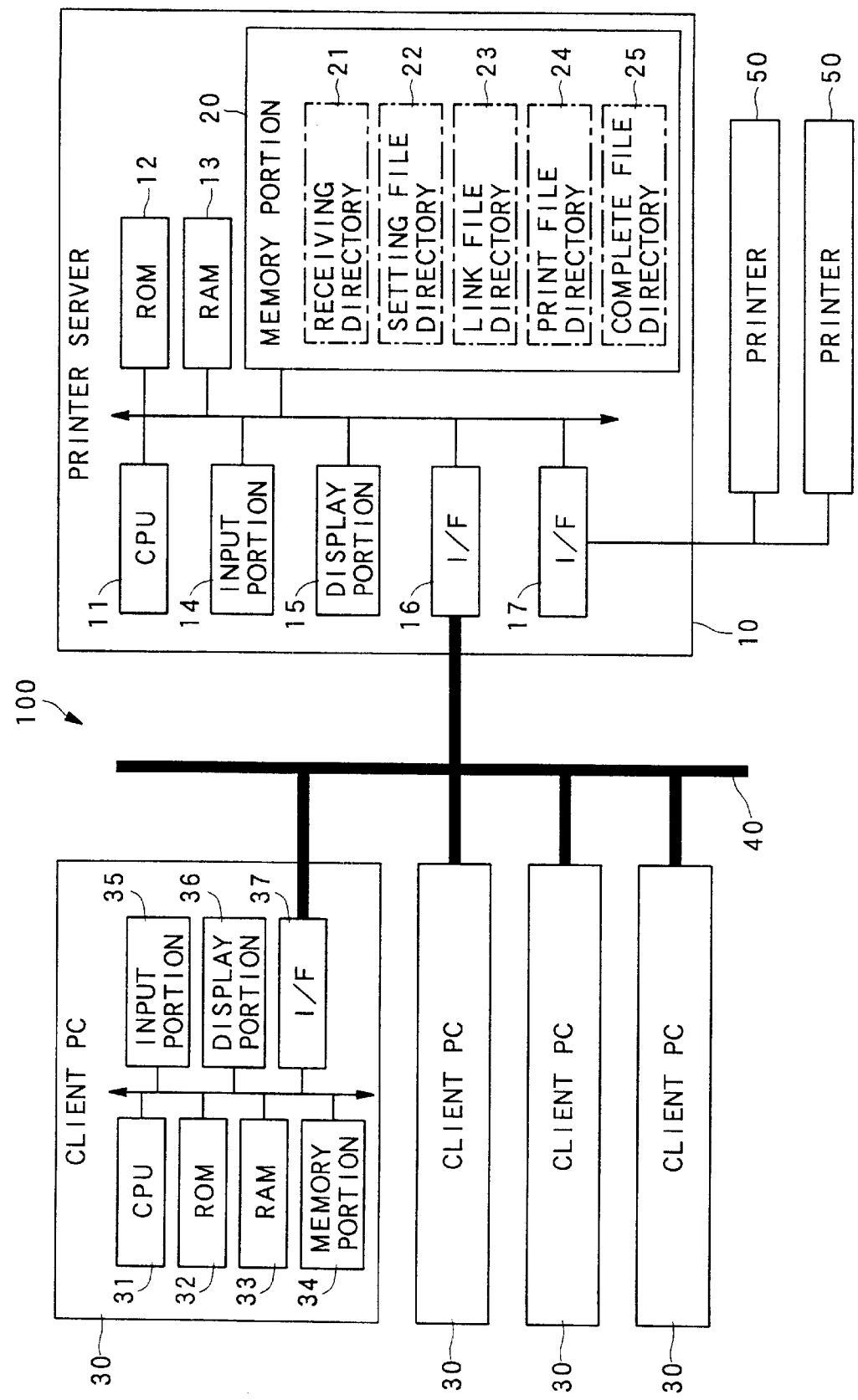
FIG. 1 is a block diagram showing a print system according to a first embodiment of the present invention.

FIG. 1 shows a print system in this embodiment. As shown in FIG. 1, a print system 100 has a printer server 10, a plurality of client personal computers 30 (to be referred to simply as "client PC 30" hereinafter). The printer server 10 is connected to each of the client PCs 30 through a communication network 40.

The printer server 10 is constructed by a computer such as a personal computer and a workstation. The printer server 10 has a CPU 11, a ROM 12, a RAM 13, an input portion 14, a display portion 15, a network interface (I/F) 16, a printer interface (I/F) 17 and a memory portion 20, which elements are connected to one another through a bus. To the printer server, a plurality of printers 50 are also connected through the printer I/F 17.

Figure 2:
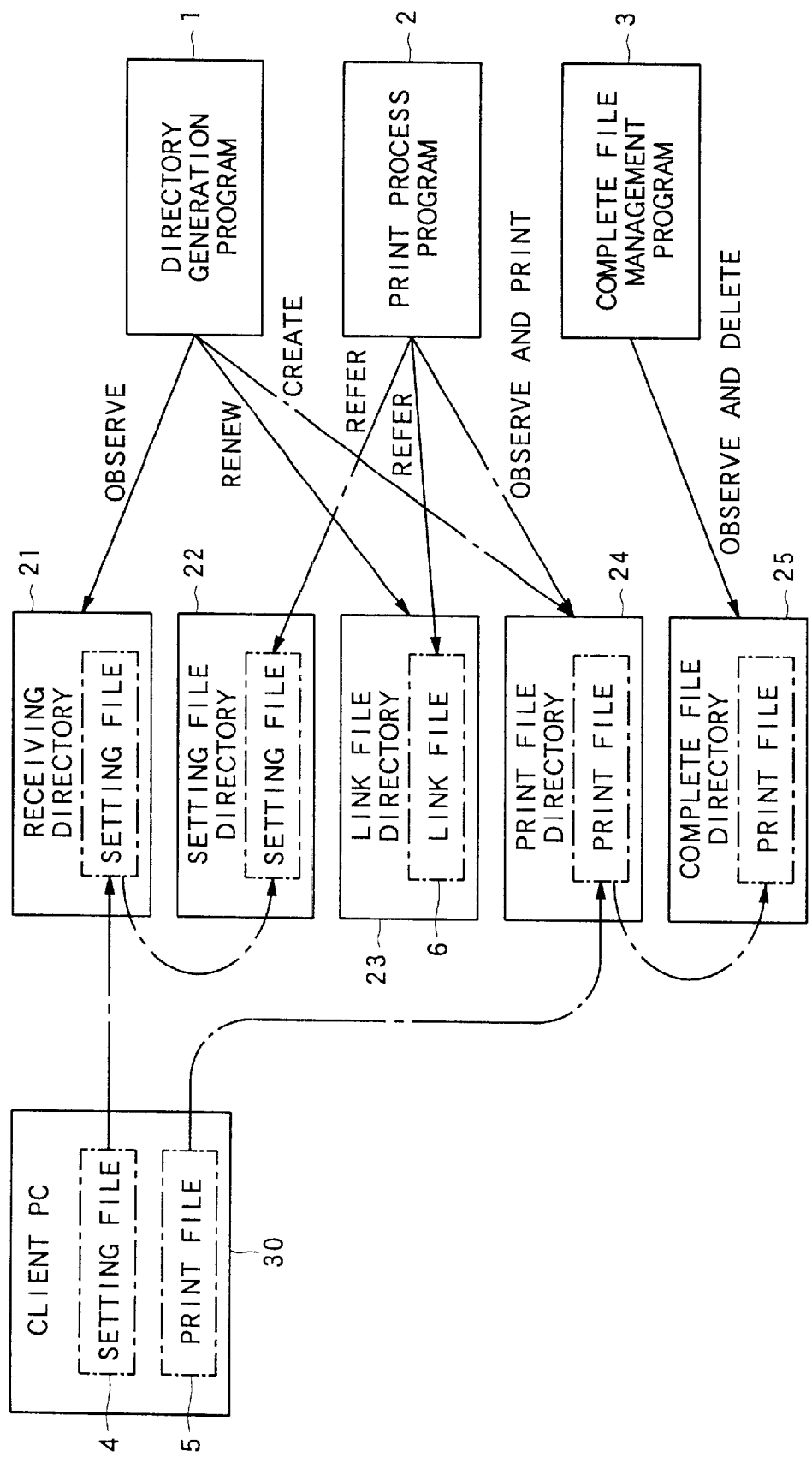
FIG. 2 is a view for showing print processing according to the first embodiment of the present invention.
Figure 6:
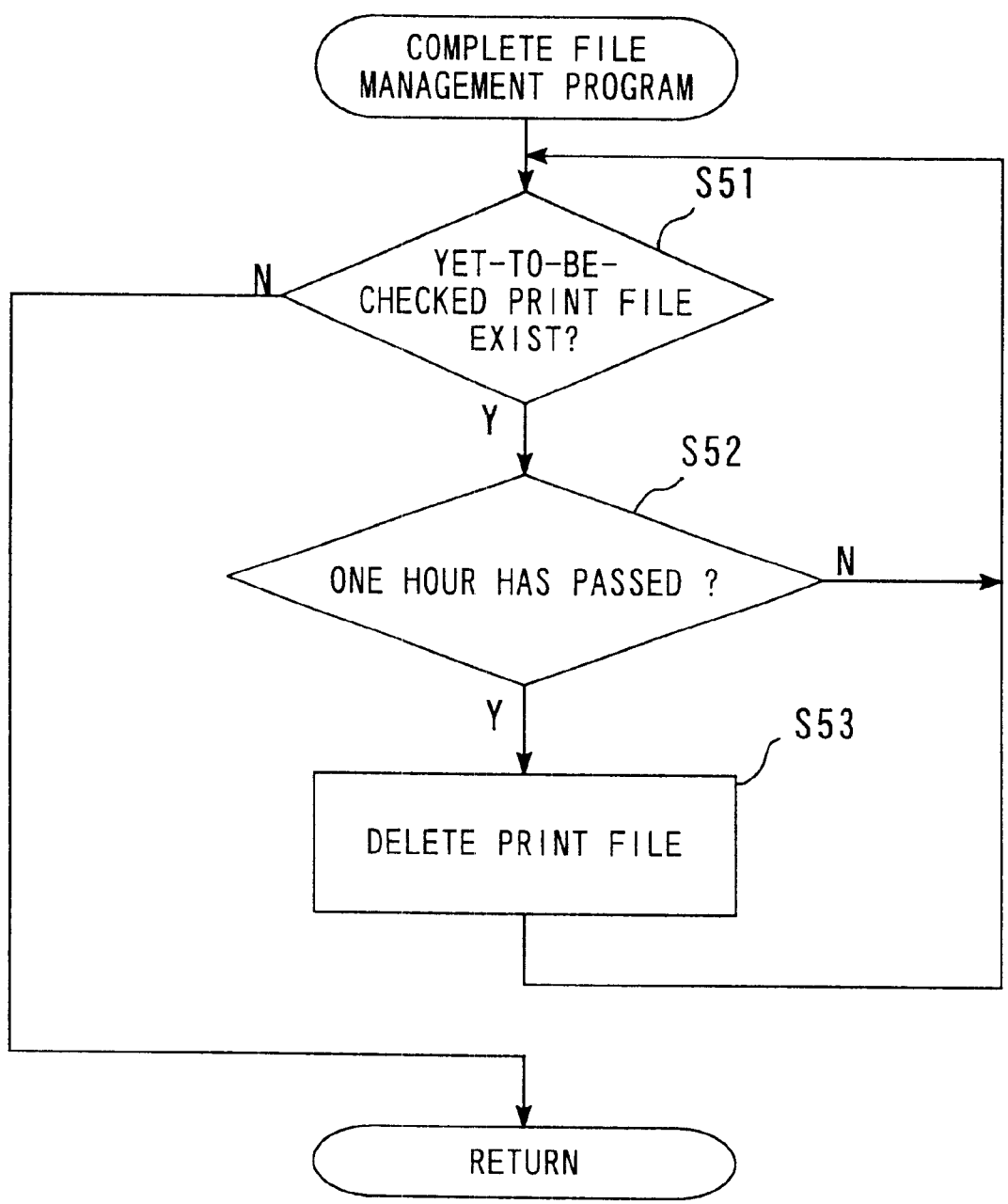
FIG. 6 is a flow chart showing processing through a complete file management program according to the first embodiment of the present invention.

The CPU 11 controls the printer server 10. The CPU 11 also generates a directory (folder) and conducts print processing and manages a complete file by executing a main program, a directory generation program, a printing process program and a complete file management program as shown in FIGS. 2 and 6.

The ROM 12 stores the main program, the directory generation program, the print processing program and the complete file management program. The ROM 12 also stores other programs and data for controlling the printer server 10. The RAM 13 is used as a working area while the printer server 10 is controlled by the CPU 11.

The input portion 14 inputs data or a command into the printer server 10 and consists of a keyboard, a mouse, a switch panel and other input devices. The display portion 15 displays characters, numeric values and/or images to confirm the data or the command input into the printer server 10 from the input portion 14, check the operational status of the printer server 10 or the like. The display portion 15 can be, for example, a CRT display and a liquid crystal display.

The network interface 16 serves to connect the printer server 10 to the communication network 40. The network interface 16 conducts input control of data transmitted from the communication network 40 to the printer server 10 and output control of data transmitted from the printer server 10 to the communication network 40. The printer interface 17 serves to conduct output control of data transmitted from the printer server 10 to each of the printers 50 and input control of data transmitted from each printer 50 to the printer server 10.

The memory portion 20 consists of a reloadable memory such as a RAM and a hard disk. The memory portion 20 also performs memory management functions which involve generating and setting directories (such as physical or logic memory areas or folders). In the memory portion 20, there are provided a receiving directory 21, a setting file directory 22, a link file directory 23, a print file directory 24, and a complete file directory 25, each of which directories will be later described.

The printer 50 functions as a print engine to actually output print data onto paper. In other words, the printer 50 serves as a device to print or output the print data which has been print-processed by the printer server 10 onto a paper sheet or more. Although FIG. 1 shows that two printers 50 are connected to the printer server 10, the number of printers 50 connected thereto may be one or not less than three. The printer(s) 50 may be not only connected to the printer server 1 through the printer interface 17 but also to the communication network 40.

Each client PC 30 includes a CPU 31, a ROM 32, a RAM 33, a memory portion 34, an input portion 35, a display portion 36 and a network interface 37, which are connected to one another through a bus.

The CPU 31 is a central processing unit to control the operation of the client PC 30. The ROM 32 stores, for example, a program for controlling the operation of the client PC 30. The RAM 33 is used as a working area while the above-stated program is executed by the CPU 31. The memory portion 34 consists of, for example, a hard disk. The input portion 35 consists of, for example, a keyboard and a mouse and is used to input data or a command into the client PC 30. The display portion 36 consists of, for example, a CRT display and a liquid crystal display. The network interface 37 serves to connect the client PC 30 to the communication network 40 and is an interface to control data input/output between the client PC 30 and the communication network 40.

In the ROM 32 or the memory portion 34 of each of the client PC 30, a program for allowing the client PC 34 to function as an input device for inputting a print file 5 or a setting file 4 into the printer server 10 is stored. If the program is executed by the CPU 31 of the client PC 30, the client PC 30 functions as an input device for inputting the print file 5 or the setting file 4 into the printer server 10. The client PC 30 can not only input the print file 5 or the setting file 4 but remotely operate the printer server 10.

Although FIG. 1 shows that four client PCs 30 are connected to the communication network 40, the number of the client PCs connected may be one, two, three, five or more. If the number of the client PC 30 is one, the client PC 30 may be directly connected to the printer server 10 not by way of the communication network 40.

Next, description will be given to print processing realized by means of the print system 100 according to this embodiment.

First, as shown in FIG. 2, the client PC 30 generates a setting file 4. The setting file 4 means a file in which print parameters are described. The print parameters involve parameters for setting, for example, a printing method, a paper size, a font, the number of printout sheets, a type of ink for printing, color edit, scale of enlargement·scale of reduction (scaling), printer selection and other necessary print requirements. The setting file 4 generated by the client PC 30 is transmitted to the printer server 10 through the communication network 40.

Figure 7:
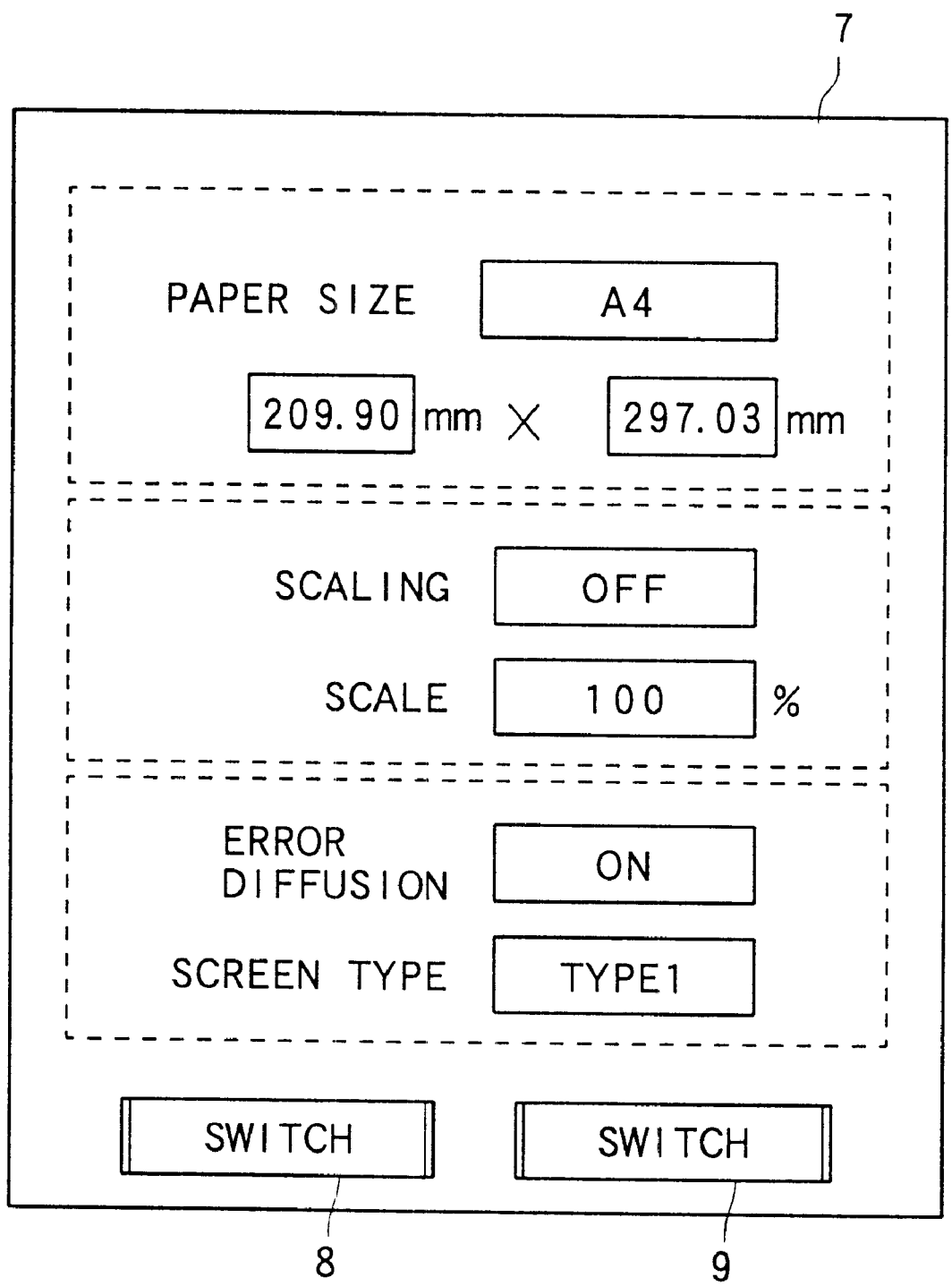
FIG. 7 is a view showing an image displayed on a display portion of a client PC when a setting file is generated and transmitted by the client PC according to the first embodiment of the present invention.

Now, the generation and transmission of a setting file 4 by the client PC 30 will be described in more detail. When a setting file 4 is generated and transmitted by the client PC 30, a setting file creation image 7 is displayed on the display portion 36 of the client PC 30, as shown in FIG. 7. A user may input print parameters, including a paper size, scaling, a printing method (whether to use an error diffusion method) and the like, into the client PC 30 using the input portion 35 while observing the setting file creation image 7. As a result, a setting file 4 is generated within the client PC 30. If the user presses a switch 8 (by, for example, clicking the switch 8 with a mouse or the like) within the setting file creation image 7 by operating the input portion 35, then the generated setting file 4 is transmitted to the printer server 10 from the client PC 30. The transmission of the setting file 4 is stopped if the user presses a switch 9.

The setting file 4 transmitted from the client PC 30 to the printer server 10 is input into the receiving directory 21 generated in the memory portion of the printer server 10 and temporarily stored in directory 21, as shown in FIG. 2. At this moment, the CPU 11 of the printer server 10 monitors whether or not the setting file 4 is input into the receiving directory 21 in accordance with the directory generation program 1. When the setting file is input, the CPU 11 confirms that the same content of setting file has not been input before and generates a print file directory 24 linked to the setting file 4 within the memory portion 20. The CPU 11 moves the setting file 4 stored in the receiving directory 21 to the setting file directory 22. The setting file 4 is, thus, stored in the setting file directory 22.

Then, the CPU 11 also generates a link file 6 in accordance with the display generation program 1. If a link file 6 already exists, the CPU 11 updates the existing file 6. The link file 6 contains link data and is stored in the link file directory 23. The link data serves to link (interrelate) the print file directory 24 with the setting file 4.

Figure 8:
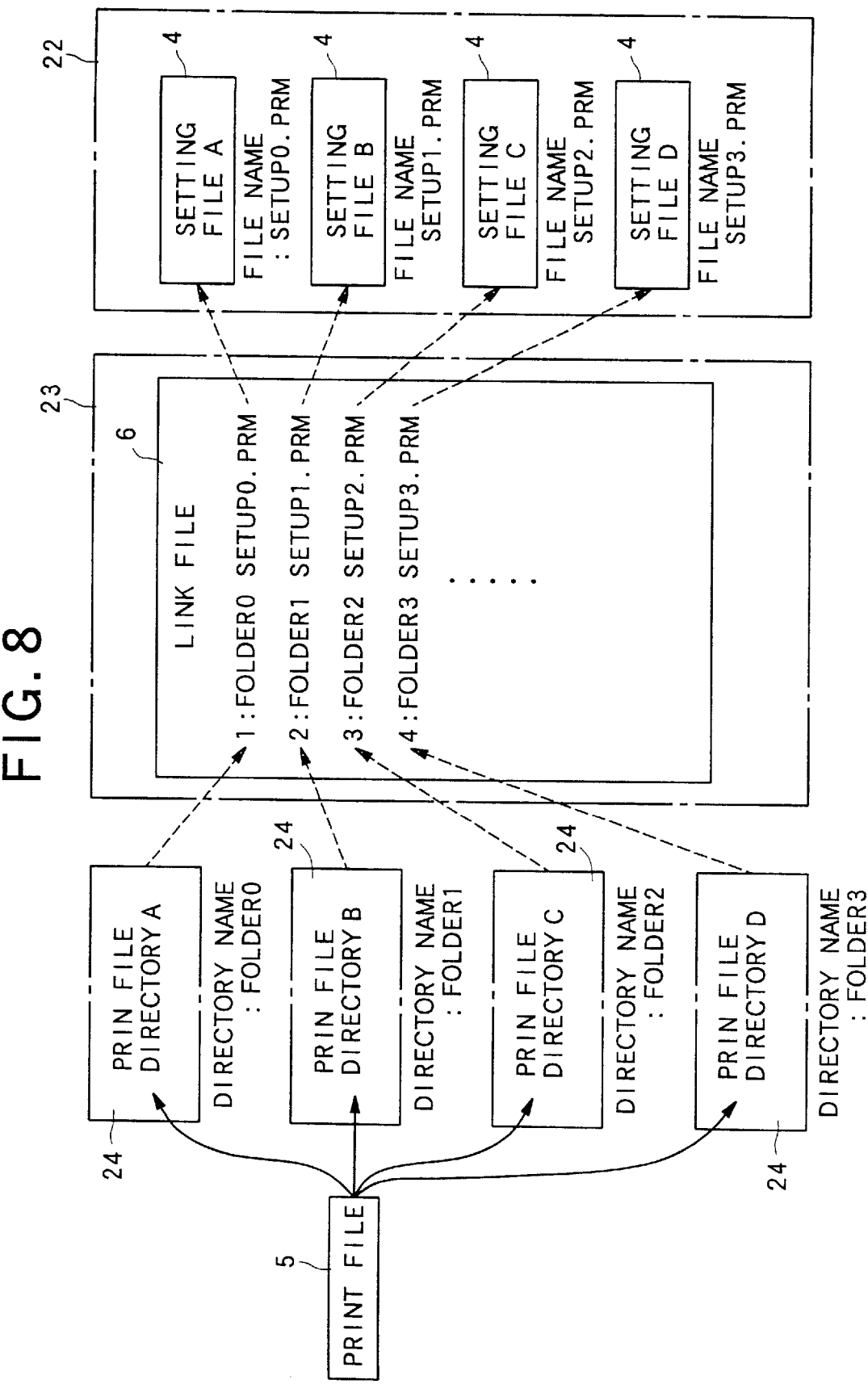
FIG. 8 is a view showing a print file directory, a link file, a setting file and the like according to the first embodiment of the present invention.

Now, the link file will be described. As shown in FIG. 8, the link file 6 consists of rows of names of print file directories 24 and those of setting files 4. When a print file directory A is generated by inputting the setting file A into the receiving directory 21, for example, the name of the print file directory A, i.e., "FOLDER0" and that of the setting file A, i.e., "SETUP0.PRM" are described in a row within the link file 6, as depicted by FIG. 8. Thus, it is determined that the print file directory and the setting file which are described in a row within the link file 6 are linked to each other.

If the setting files 4 are transmitted from a client PC 30 to the printer server 10 several times, a print file directory 24 linked to a setting file 4 is generated every time the setting file 4 is input into the receiving directory 21 of the printer server 10. Whenever a print file directory 24 is generated, the link file 6 is updated. Specifically, referring to FIG. 8, whenever a print file directory 24 is generated, a row of the name of the generated print file directory 24 and that of a setting file 4 linked to the directory 24 is added to the link file 6. More specifically, FIG. 8 shows a state in which setting files A, B, C and D are input into the receiving directory 21 and four print file directories A, B, C and D are thereby created. Within the link file 6 shown in FIG. 8, names of the respective file directories A, B, C and D (FOLDER0, FOLDER1, FOLDER2, FOLDER3) and names of the respective setting files A, B, C and D (SETUP0.PRM, SETUP1.PRM, SETUP2.PRM, SETUP3.PRM) are described as follows:

(Line 1) 1: FOLDERO SETUP0.PRM
(Line 2) 2: FOLDER1 SETUP1.PRM
(Line 3) 3: FOLDER2 SETUP2.PRM
(Line 4) 4: FOLDER3 SETUP3.PRM.

In printing an image, a user operates the client PC 30 to transmit the print file 5 from the client PC 30 to the print file directory 24 of the printer server 10, as shown in FIG. 2. Since the print file directory 24 of the printer server 10 is shared among the respective client PCs 30 through the network, the user can observe the print file directory 24 of the printer server 10 on the user3 s own client PC 30. As a result, the user can transmit the print file 5 to the print file directory 24 of the printer server 10 only by copying or moving the file 5 to a virtual print file directory viewed on the client PC 30. Here, the print file means a file in which print data sets are described and the print data may be, for example, document data and image data. The print data is described with a page description language (PDL) such as PostScript (a trademark by Adobe Systems Incorporated).

The print file 5 transmitted from the client PC 30 to the printer server 10 is input into and stored in the print file directory 24. At this time, the CPU 11 of the printer server 10 monitors whether or not a print file 5 is input to the print file directory 24 in accordance with the print processing program 2. When the print file 5 has been input, the CPU 11 refers to the link file 6 stored in the link directory 23 and specifies a setting file 4 linked to the print file director 24 into which the print file 5 has been input. The CPU 11 then sets a printing method, a paper size, a font, the number of printout paper sheets, a type of ink for printing, color edit, scale of enlargement·scale of reduction (scaling), screening, whether or not preview display is available and the like in accordance with the print parameters described in the setting file 4. With the setting, the CPU 11 processes the print data 5 described in the print file 5 and controls the printer 50 so as to print the print file 5 stored in the print file directory 24. As a result, the print data described in the print file 5 is printed on paper by the printer 50. In addition, the print data described with a page description language is converted to, for example, bit-map data by the processing of the print data.

When print operation is completed, the print file 5 is automatically transferred to the complete file directory 25. At this moment, the CPU 11 monitors the print file 5 transferred to the complete file directory 25 in accordance with the complete file management program 3. The CPU 11 deletes the print file 5 thus transferred to the complete file directory 25 after a predetermined period of time of the transfer of the print file 5 to the directory 25.

Next, the operation of the printer server 10 for the above-stated print processing will be described in accordance with the flow charts shown in FIGS. 3 through 6.

Figure 3:
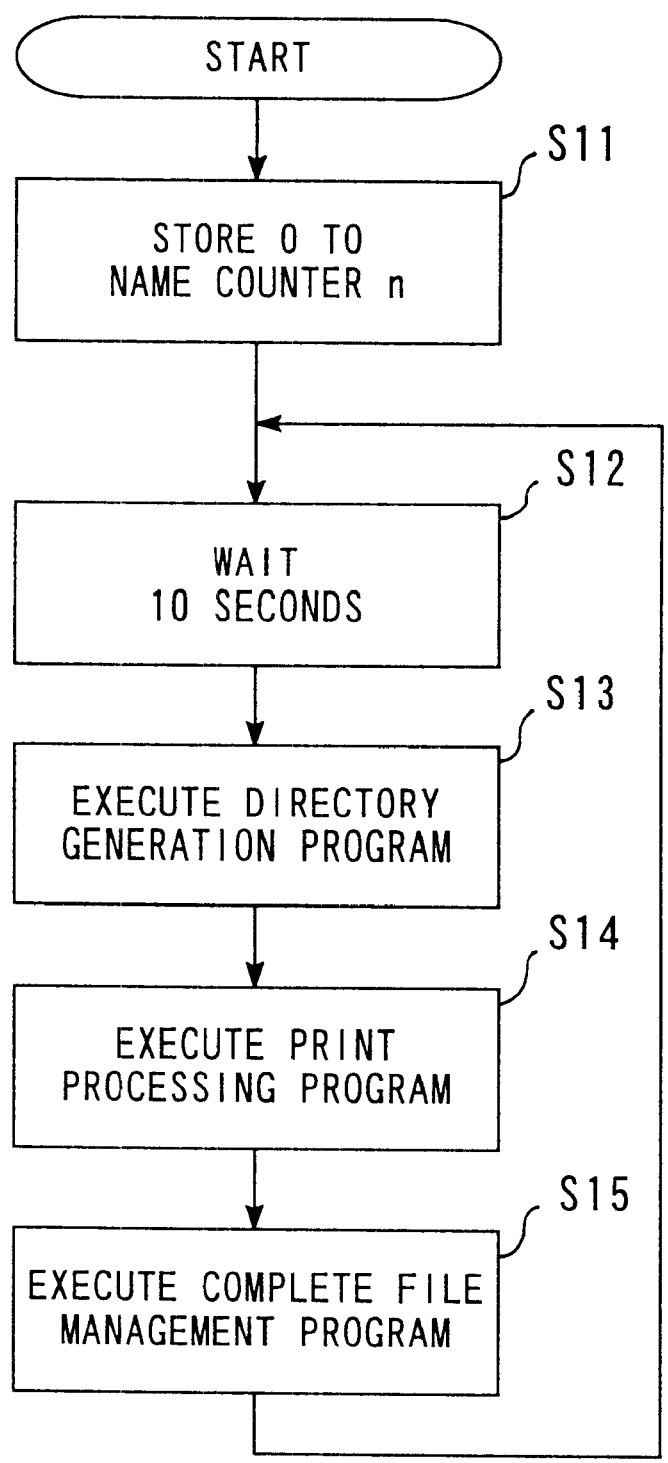
FIG. 3 is a flow chart showing processing through a main program executed by a printer server at the time of print processing according to the first embodiment of the present invention.

In print processing, the main program 3 shown in FIG. 3 is executed by the CPU 11 of the printer server 10. First, processing through the main program will be described.

In step 11 of FIG. 3, the CPU 11 stores 0 in a name counter n and initializes the name counter n. In step 12, the CPU 11 waits, for example, for 10 seconds. In step 13, the CPU 11 starts the directory generation program shown in FIG. 4, monitors the setting file 4, generates a print file directory 24 and updates the link file 6. Next, in step 14, the CPU 11 starts the print processing program shown in FIG. 5, monitors the print file 5 and prints out the print file 5. In step 15, the CPU 11 starts the complete file management program shown in FIG. 6 and deletes the complete file in the complete file directory 25.

The CPU 11 repeatedly executes processing steps 12 to 15. As a result, a series of processing in accordance with the directory generation program, print processing program and complete file management program are repeatedly executed at 10 seconds' intervals. The stand-by time in the step 12 should not be limited to 10 seconds. It may be arbitrarily set based on frequency with which setting files are input into the receiving directory 21, that with which print files are input into the print file directory 24 and the like.

Now, description will be given to processing through the directory generation program shown in FIG. 4.

Figure 4:
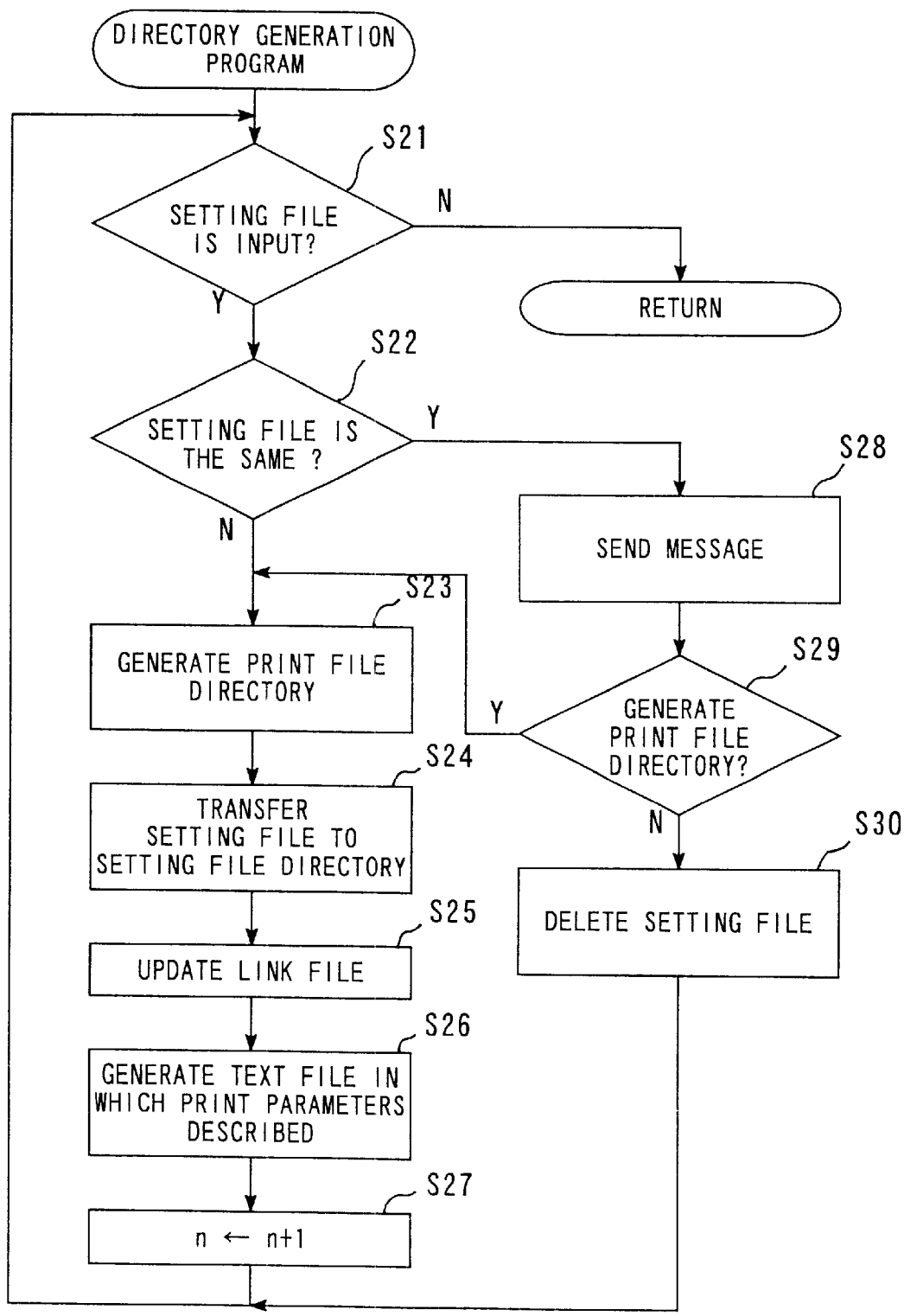
FIG. 4 is a flow chart showing processing through a directory generation program according to the first embodiment of the present invention.

In step 21 shown in FIG. 4, the CPU 11 determines whether or not a setting file has been input into the receiving directory 21. If it is determined that a setting file has been input into the receiving directory 21, the CPU 11 proceeds with step 22. If it is determined that a setting file has not been input into the receiving directory 21, the CPU 11 ends the directory generation program. As a result, processing returns to that through the main program. The directory generation program is executed at 10 seconds' intervals by the main program, so that the determination as to whether a setting file is stored in the receiving directory 21 is at 10 seconds' intervals.

In step 22, the CPU 11 determines whether or not the setting file input into the receiving directory 21 is the same as one of those already stored in the setting file directory 22. If it is determined that the setting file input into the receiving directory 21 coincides with one of those already stored in the setting file directory 22, it follows that there already exists a print file directory 24 linked to the setting file with the same content in the memory portion 20 of the printer server 10. For purposes of informing a user of the fact, the CPU 11 generates a message saying "Do you actually want to generate a print file directory?". The CPU 11 then returns this message to the client PC 30 from which the setting file is transmitted to the printer server 10 (step 28). As a result, the message appears on the display portion 36 of the client PC 30. When the user sees this message, he or she operates the input portion 35 and inputs a command to either generate or not generate a print file directory 24 into the client PC 30. The user's command is transmitted to the printer server 10. Further, in step 29, the CPU 11 determines whether or not the print file directory 24 is to be generated based on the command from the user. If it is determined that a print file directory 24 is not to be generated, the CPU 11 deletes the setting file stored in the receiving directory 21 in step 30.

Meanwhile, in case of generating a print file directory 24, the CPU 11 generates a print file directory 24 in accordance with the setting file stored in the receiving directory 21 in step 23. At this time, the CPU 11 puts a name on the print file directory 24. The name of the print file directory 24 is generated using the name counter n. More specifically, a numeric value is stored in the name counter n, which value increments by one every time a print file directory 24 is generated (in step 27). Therefore, the numeric value is used as part of the name of the print file directory 24, thereby making it possible to prevent redundantly putting the same name on different print file directories. As shown in FIG. 8, for example, print file directories A, B, C and D are named "FOLDER0", "FOLDER1", "FOLDER2" and "FOLDER3", respectively and values 0, 1, 2 and 3 are stored in the name counter n.

In step 24, the CPU 11 transfers the setting file stored in the receiving directory 21 to the setting file directory 22. Then, a name is allotted to the setting file so as not to repeat the names of the setting files already stored in the setting file directory 22. The name counter n stated above may be used for naming the setting file.

In step 25, the CPU 11 updates the link file 6 to link the setting file 4 transferred to the setting file directory 22 to the print file directory 24 generated correspondingly with the setting file 4. Specifically, as stated above, the CPU 11 adds a row of the name of the print file directory 24 and that of the corresponding setting file to the link file 6.

In step 26, the CPU 11 describes print parameters described in the setting file which has been moved to the setting file directory 22 to another new file using text data. The CPU 11 then stores the file as a text file in the print file directory 24 linked to the setting file 4.

As stated above, the print file directory 24 is shared among client PCs 30. Due to this, once the text file including print parameters is stored in the print file directory 24, the user can open the text file on the user's client PC 30 and see the print parameters described in the text file. Thus, the user can easily recognize the print parameters linked to the print file directory 24.

In step 27, the CPU 11 increments the value of the name counter n by one and returns its process to the step 21.

Next, processing through the print processing program shown in FIG. 5 will be described.

Figure 5:
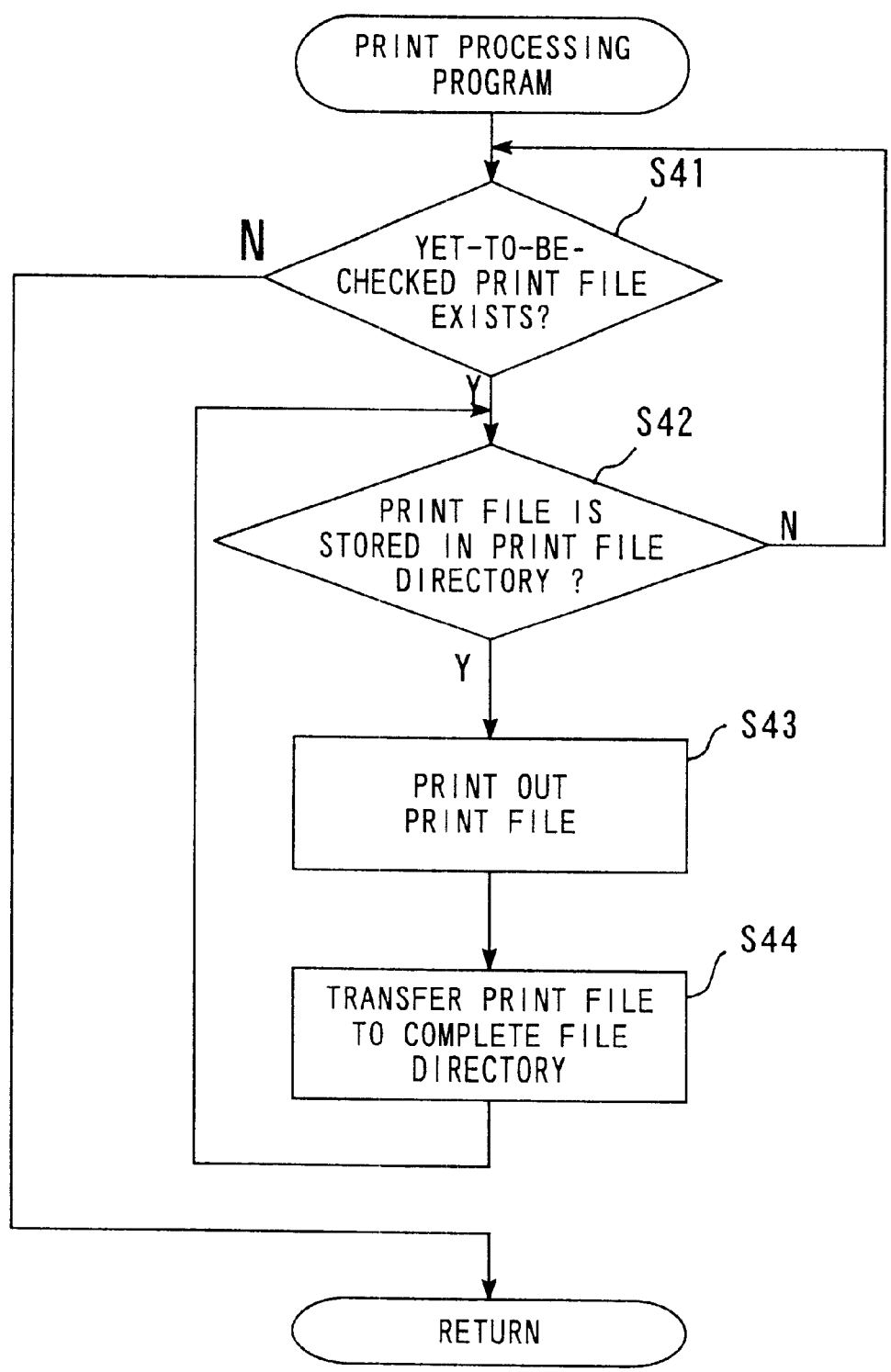
FIG. 5 is a flow chart showing processing through a print processing program according to the first embodiment of the present invention.

In step 41 shown in FIG. 5, the CPU 11 checks the print file directories 24 within the memory portion 20 and then determines whether or not there exists a print file directory 24 which has not been checked yet. If CPU 11 is determined that a yet-to-be-checked print file directory 24 exists, the CPU 11 executes step 42. On the other hand, if it is determined that no yet-to-be-checked print file directory 24 exists, the CPU 11 ends the print processing program. Consequently, processing returns to that through the main program.

In step 42, the CPU 11 determines whether or not a print file is stored in the print file directory 24. If it is determined that a print file is stored in the print file directory 24, the CPU 11 prints out the print file (step 43). Specifically, the CPU 11 first specifies a setting file linked to the print file directory 24 in which the print file is stored by referring to the link file. In accordance with the print parameters described in the setting file, the CPU 11 processes the print data described in the print file, while controlling the printer 50.

In step 44, the CPU 11 transfers the print file which has been print-processed from the print file directory 24 to the complete file directory 25. Consequently, the print file which is done with print processing is deleted from the print file directory 24.

The complete file directory 25 as well as the print file directory 24 is shared among the client PCs 30. Due to this, a user can see the complete file directory 25 on user's client PC 30. The user can, therefore, fetch a print file stored in the complete file directory 25 by operating the client PCs 30. Due to this, it is able to reuse the print file completed yet.

In step 44, while the print file is transferred from the print file directory 24 to the complete file directory 25, the CPU 11 converts time at the instance of transfer into a character string. Then, the CPU 11 adds the character string to the name of the transferred print file. If, for example, the name of the print file prior to transfer is "filename.ext" and the transfer occurs at two thirty and three seconds on December 21, then the name of the file after transfer is expressed as "filename.ext-12#31 (01h02m03s)".

The purpose to add time to the name of the print file 5 which has been transferred to the complete file directory 25 is to leave sequentially input print files 5 allotted the same name in the complete file directory 25. If, for example, the color of a printed image is to be checked, the user prints out a single image several times with color parameters slightly changed. In that case, the user sequentially transmits print files 5 from the client PC 30 to the printer server 10 while gradually differentiating the print files 5 from others. As a result, print files having the same name are sequentially input into the print file directory 24 of the printer server 10. Whenever a print file 5 is input, the printer server 10 conducts print processing (in step 43) to the print file 5 and transfers the file 5 to the complete file directory 25. If print files 5 allotted the same name are transferred to the complete file directory 25 without changing names, the same names of the print files 5 repeatedly exist. To prevent the repeated names, the printer server 10 of the present invention changes names of the print files in step 44. By so doing, it is possible to prevent overwriting the print files 5 in the complete file directory 25 and to leave all of the print files 5 which have been printed in the complete file directory 25. Moreover, since time is indicated on the file name, the user can identify a print file based on the described time.

Next, processing through the complete file management program shown in FIG. 6 will be described.

In step 51 of FIG. 6, the CPU 11 determines whether or not there exists a yet-to-be checked print file 5 in the complete file directory 25. If it is determined that a yet-to-be-checked print file 5 exists therein, the CPU 11 executes step 52. If, on the other hand, a yet-to-be-checked print file 5 does not exist, the CPU 11 ends the complete file management program. Consequently, processing returns to that of the main program.

In step 52, the CPU 11 determines whether one hour, for example, has passed since a print file 5 was transferred to the complete file directory 25. The record of time at which the file was transferred is stored by, for example, the operating system, the file management program or the like in the printer server 10. Owing to this, it is possible to know what time the print file 5 was transferred to the complete file directory 25. The CPU 11 can determine whether one hour has passed since the print file 5 was transferred to the complete file directory 25 with reference to time, as well. Based on the determination result, the CPU 11 deletes a print file when one hour has passed since the file was transferred to the complete file directory 25 (in step 53). It is noted that timing at which the print file 5 stored in the complete file directory 25 is deleted should not be limited to one hour after the print file 5 was transferred to the complete file directory 25. The timing may be, for example, 12 hours or one day after the print file 5 was transferred to the complete file directory 25. The timing, thus, can be set at the user's discretion.

As can be understood from the above, according to the print system 100 in this embodiment, if a setting file 4 is transmitted from a client PC 30 toward the printer server 10, a print file directory 24 linked to the setting file 4 is automatically generated. Then, a print file 5 can be easily printed in accordance with print parameters described in the setting file 4 only by transmitting the print file 5 from the client PCs 30 to the print file directory 24.

Even if print files 5 consisting of different types of print data sets exist, they can be printed only by transmitting their respective print files 5 to the print file directory 24 as long as the print data described in the print files 5 are described in printable data formats by the print server 10.

Accordingly, the print files 5 can be easily printed without need of executing application software corresponding to respective print files 5 every time a print file 5 is printed. Even if the print files 5 in which different types of print data are described, respectively are printed, there is no need to prepare plural different application software corresponding to the different print files 5, respectively. Further, once a setting file 4 is transmitted to the printer server 10, many print files 5 can be easily printed in accordance with certain print parameters without need of setting print parameters every time a print file 5 is output.

Moreover, since the print file directory 24 is shared among the respective client PCs 30, the user has no difficulty in printing a print file 5 which the user intends to print only by copying or moving the print file 5 to the print file directory 24 which the user can see on the user's client PC 30.

Besides, if setting files 4 are transmitted from the client server PC 30 a plurality of times, a plurality of print file directories 24 linked to a plurality of setting files 4 can be generated within the printer server 10, as shown in FIG. 8. Since the plural print file directories 24 are shared among the respective client PCs 30, users can see a plurality of print file directories 24 through their own client PCs 30. Therefore, only by selecting a print file directory 24 and copying or transferring a print file to the selected print file directory on the client PC on hand, print data can be easily printed with various types of print parameter setting.

II. Second Embodiment

Now, the second embodiment according to the present invention will be described with reference to the accompanying drawings. In the second embodiment, as in the case of the first embodiment, description will be given, taking a case of applying the present invention to the print system as an example.

In the first embodiment stated above, if the receiving directory 21 of the printer server 10 receives a plurality of different setting files 4 from client PCs 30, the printer server 10 generates a plurality of print file directories 24 linked to the setting files 4, respectively. In the second embodiment, by contrast, the printer server 210 contains only one common directory, which directory receives both setting files 4 and print files 5. Even if a plurality of different setting files 4 are transmitted from client PCs 30, only the single common directory receives the print files 5.

Figure 9:
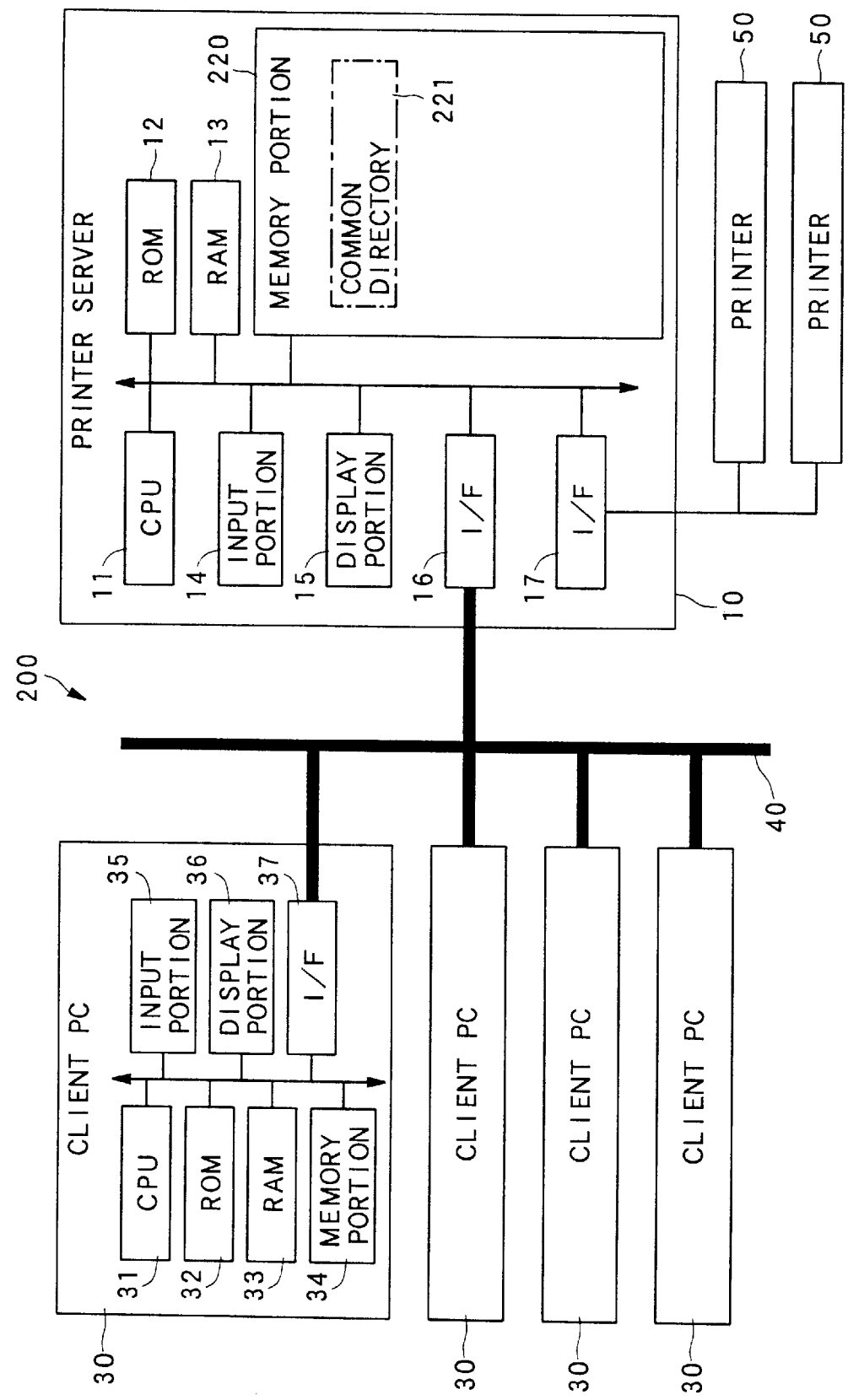
FIG. 9 is a block diagram showing a print system according to a second embodiment of the present invention.

FIG. 9 shows a print system in this embodiment. As shown in FIG. 9, the constitution of the print system 200 is the same as that of the print system 100 in the first embodiment except for a memory portion 220 provided in the printer server 210.

Figure 10:
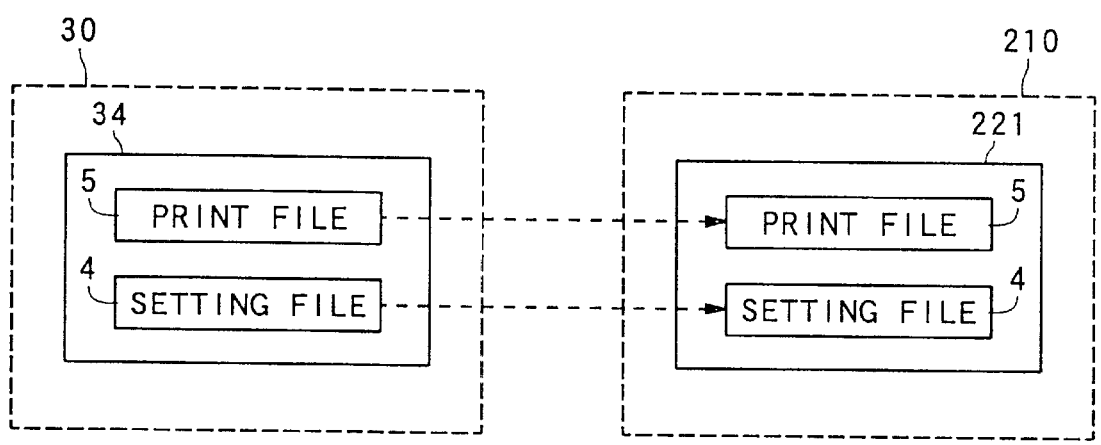
FIG. 10 is a view showing print processing according to the second embodiment of the present invention.

The memory portion 220 may consist of a reloadable, high storage capacity memory such as a RAM and a hard disk. The memory portion 20 includes a common directory 221 serving as a memory region for holding print files and setting files transmitted from the respective client PCs 30. The common directory 221 is shared among all of the client PCs 30, which can access the common directory 221. As shown in FIG. 10, the common directory 21 receives and stores both setting files 4 and print files 5.

Figure 11:
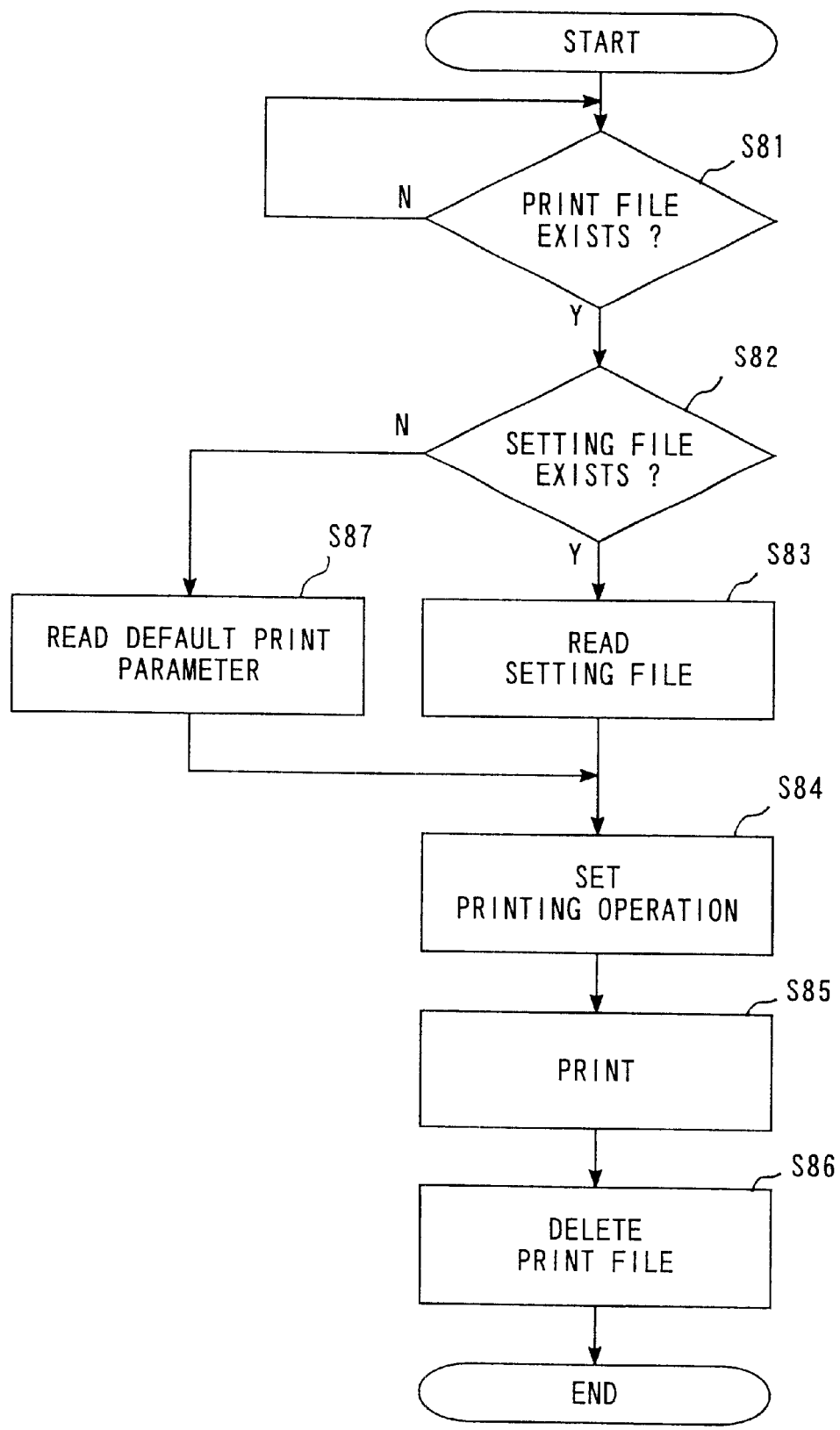
FIG. 11 is a flow chart showing processing through a printing process program according to the second embodiment of the present invention.

FIG. 11 shows a print processing program in this embodiment. The print processing program is executed by a CPU 11 of a printer server 210.

While the process shown in FIG. 11 is being executed, the CPU 11 of the printer server 10 monitors that print files 5 and setting files 4 are transmitted from client PCs 30 to the common directory 221. The CPU 11 examines the content of the common directory 221 at predetermined time intervals (such as at 10 intervals) and determines whether or not these files are input into the common directory 221.

In step 81, the CPU 11 determines whether or not a print file 5 exists in the common directory 221. If it is determined that the print file 5 exists, the CPU 11 goes on to step 82. If it is determined that the print file 5 does. not exist, the CPU 11 executes the step 81 again.

In step 82, the CPU 11 determines whether or not a setting file 4 corresponding to the print file 5 exists in the common directory 221. If it is determined that the setting file 4 exists, the CPU 11 executes step 83. If it is determined that the corresponding setting file 4 does not exist, the CPU 11 executes step 87.

The correlation between a print file 5 and a setting file 4 may be defined based on file names. For instance, names of the print files 5 and setting files 4 are created out of their name main bodies and extensions (suffixes), respectively. A common extension is allotted to all of the print files 5 and another common extension is allotted to all of the setting files 4. If a print file 5 corresponds to a setting file 4, their name main bodies are the same. Following this rule, it is possible to easily determine whether a print file 5 corresponds to a setting file 4. Further, if it is assumed that a plurality of setting files 4 do not exist simultaneously in the common directory 221, a preset file name such as setting.txt can be given to a setting file 4.

In step 83, the CPU 11 reads the setting file 4 from the common directory 221 and acquires print parameters described in the setting file 4.

Meanwhile, in step 87, the CPU 11 acquires default print parameters prepared in advance in the printer server 10. The printer server 10 in this embodiment contains most standard parameters as default print parameters for every setting item. In a case where the user of a client PC 30 wants to print a print file in a default-set standard manner, all the user needs is to transmit the print file 5 to the common directory 221, whereby the print file 5 can be printed without need of transmitting the setting file 4.

In step 84, a printing operation is set based on the print parameters acquired in either the step 83 or the step 87. In case of the print parameters shown in, for example, FIG. 12, a paper size is set at A4, color edit process is conducted to refer to a color profile, scale of enlargement is set at two times (200%), screening is conducted by the error diffusion method and the printing result is displayed as preview prior to print processing.

In step 85, print data contained in the print file 5 is printed. That is, the print data is expanded into a data format compatible with the printer 50 and the resultant data thus acquired is output to the printer 50. Consequently, a printed image is formed on the print paper sheet.

In step 86, the CPU 11 deletes the print file 5 which data has been printed. One print processing basically corresponds to one transmission of a print file 5. Due to this, it is not required to leave the print file which data has been printed in the common directory 221.

The CPU 11, however, does not delete the setting file 4. This makes it possible to repeat print processing for a plurality of print files 5 using the same setting file 4. If, therefore, the setting file 4 already transmitted to the common directory 221 is used again, all the user needs is to transmit a print file 5 from the user's client PC 30. This can save the user's time. In addition, the user can transmit a setting file 4 having the same file name as that of the already transmitted setting file 4 and different printer parameters. As a result, the newly transmitted setting file 4 replaces the setting file 4 already stored in the common directory 221. The content of the printer parameters for the setting file 4 can be thus updated.

It is noted that determination as to whether or not print processing is conducted is made after a print file 5 and a setting file 4 are transmitted, the print file 5 is not necessarily deleted in the step 6.

If a plurality of print files 5 are transmitted, the CPU 11 repeatedly executes the above-stated steps 81 to 86.

According to the print system 200 in this embodiment, it is not necessary for a user to perform print setting operation using application software in response to a request to print a print file 1. The user can print the print file 5 only by transmitting the print file 5 and the setting file 4 to the common directory 221 of the printer server 10. Since the common directory 221 is shared among the respective client PCs, all the user needs, in practice, is to copy the virtually existing common directly 221 on the user's client PC 30 to thereby print the print file 5. In case of using the already transmitted setting file 4 again, if only the print file 5 is copied in the common directory 221, the file 5 can be printed. Thus, greatly simplified print operation can be realized.

The printer server 10 can also manage print processing only by monitoring files input from the client PCs 30 to the common directory 221. In addition, it is possible to easily determine how a print file 5 corresponds to a setting file 4 using the name main bodies and extensions of the files. Besides, if default print parameters are prepared in advance, far more simplified print processing can be realized.

Moreover, according to the present invention, a plurality of client PCs 30 and a printer server 10 are connected to one another through a network 40 and the common directory 221 are accessible from all of the equipment connected through the network 40. It is, thereby, possible to provide integrated, versatile print processing through the network 40 and to improve the overall efficiency of the print operation.

Although the embodiments described above illustrate a case where a setting file 4 is generated in a client PC 30 and then transmitted to the printer server 10, the present invention should not be limited thereto. As an alternative, print parameters may be transmitted from a client PC 30 to the printer server 10 and a setting file may be generated using the transmitted print parameters in the printer server 10. Print parameters may be also directly input into the printer server 10 at the input portion 14 of the printer server 10 and then a setting file may be generated in the printer server 10.

The setting file 4 generated in a client PC 30 may be binary data or text data. The setting file 4 may be prepared in the client PC 30 in advance.

Furthermore, the printer server 10 and printer 50 are independently provided in the embodiments above; however, the printer server 10 and printer 50 may be integral with each other.

Although the above-cited print processing program, directory generation program and complete file management program are stored in the ROM 13 of the printer server 13, the present invention should not be limited to the case. Those programs can be recorded on computer-readable recording media such as a CD-ROM and a floppy disk. In the latter case, if the programs are installed from the recording media to a computer, then the above-described print processing can be realized on the computer.

Moreover, in the embodiments described so far, description has been given, taking a case where the data output apparatus of the present invention is applied to the print system as an example. The present invention should not be limited to the case and can be also applied to other types of data output apparatuses such as a data display apparatus and a tabular output apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 10-019763 filed on Jan. 30, 1998 and No. 10-045938 filed on Feb. 26, 1998, each including the specification, claims, drawings and summary, are incorporated herein by reference in their entirety.

What is claimed is:

1. A data output apparatus for receiving a data set input from a data source, processing the data set according to an output process, and outputting the processed data set, the apparatus comprising:

a storage device in which a first storage area is formed in advance;

a first receiving device for receiving a parameter set which includes output parameters for setting a condition of the output process, and storing the received parameter set into the first storage area;

a forming device for forming a second storage area in the storage device, and linking the formed second storage area with the received parameter set;

a second receiving device for receiving a data file in which the data set comprising at least one of a document and a image is described, and storing the received data file into the second storage area;

a processing device for identifying the parameter set linked with the second area in which the received data file is stored, setting the condition of the output process according to the output parameters of the identified parameter set, and processing the data set of the received data file according to the output process whose condition is set by the output parameters of the identified parameter set; and an output device for outputting the processed data set of the received data file.

2. The apparatus according to claim 1 further comprising a determining device for determining whether or not the first receiving device receives the parameter set;

wherein, when the determining device determines that the first receiving device receives the parameter set, the forming device forms the second storage area and links the formed second storage area with the received parameter set.

3. The apparatus according to claim 1 further comprising a determining device for determining whether or not the second receiving device receives the data file;

wherein, when the determining device determines that the second receiving device receives the data file, the processing device identifies the parameter set, sets the condition of the output process, and processes the data set of the received data file, and the output device outputs the processed data set of the received data file.

4. The apparatus according to claim 1, wherein, when the first receiving device receives the several different parameter sets, the forming device forms the several second storage areas which correspond to the received several different parameter sets, respectively, in the storage device, and links the formed several second storage areas with the received several different parameter sets, respectively.

5. The apparatus according to claim 1, wherein: the forming device comprises a link data generating device for generating link data representing a linkage between the parameter set and the second storage area, and storing the generated link data into the storage device; and the processing device identifies the parameter set by referring to the generated link data.

6. The apparatus according to claim 1 further comprising a message output device for outputting a message when the parameter set that has been now received by the first receiving device is the same as the parameter set that has been previously received by the first receiving device.

7. The apparatus according to claim 1 further comprising a text data generating device for generating text data representing a content of the parameter set received by the first receiving device, and storing the generated text data into the storage device.

8. The apparatus according to claim 1, further comprising a transferring device for transferring the data file from the second storage area to a third storage area which is formed in advance in the storage device, when the processed data set of the received data file has been output by the output device.

9. The apparatus according to claim 8, further comprising a deleting device for deleting the data file stored in the third storage area, when a predetermined period of time has passed since the data file was transferred to the third storage area.

10. A data output apparatus for receiving a data set input from a data source, processing the data set according to an output process, and outputting the processed data set, the apparatus comprising:
  a storage device having a storage area;
  a receiving device for receiving a data file in which the data set comprising at least one of a document and a image is described and a parameter set which includes output parameters for setting a condition of the output process, and storing the received data file and the received parameter set into the storage area;
  a managing device for managing the received data file and the received parameter set such that the received data file and the received parameter set are linked with each other;
  a processing device for identifying the received parameter set linked with the received data file, setting the condition of the output process according to the output parameters of the identified parameter set, and processing the data set of the received data file according to the output process whose condition is set by the output parameters of the identified parameter set; and
    an output device for outputting the processed data set of the received data file;
    wherein the processing device sets the condition of the output process according to the output parameters of a default parameter set which is pre-stored in the storage device, when the processing device fails in identifying the parameter set.

11. A data output method for receiving a data set input from a data source, processing the data set according to an output process, and outputting the processed data set, the method comprising the processes of:
  receiving a parameter set which includes output parameters for setting a condition of the output process, and storing the received parameter set into a first storage area formed in advance in a storage device;
  forming a second storage area in the storage device, and linking the formed second storage area with the received parameter set;
  receiving a data file in which the data set comprising at least one of a document and a image is described, and storing the received data file into the second storage area;
  identifying the parameter set linked with the second area in which the received data file is stored, setting the condition of the output process according to the output parameters of the identified parameter set, and processing the data set of the received data file according to the output process whose condition is set by the output parameters of the identified parameter set; and
  outputting the processed data set of the received data file.

12. The method according to claim 11, wherein, when the several different parameter sets are received in the parameter set receiving process, the several second storage areas which respectively correspond to the received several different parameter sets are formed in the storage device in the forming process, and the formed several second storage areas are respectively linked with the received several different parameter sets in the forming process.

13. The method according to claim 11, wherein the forming process comprises the process of generating link data representing a linkage between the parameter set and the second storage area, and storing the generated link data into the storage device; and the parameter set is identified by referring to the generated link data and the condition of the output process is set according to the output parameters of the identified parameter set.

14. The method according to claim 11 further comprising the process of outputting a message when the parameter set that has been now received in the parameter set receiving process is the same as the parameter set that has been previously received in the parameter set receiving process.

15. The method according to claim 11 further comprising the process of generating text data representing a content of the parameter set received by the parameter set receiving process, and storing the generated text data into the storage device.

16. The method according to claim 11 further comprising the process of transferring the data file from the second storage area to a third storage area formed in advance in the storage device, when the processed data set of the received data file has been output by the outputting process.

17. The method according to claim 16 further comprising the process of deleting the data file stored in the third storage area, when a predetermined period of time has passed since the data file was transferred to the third storage area.

18. A data output method of receiving a data set input from a data source, processing the data set according to an output process, and outputting the processed data set, the method comprising the processes of:
  receiving a data file in which the data set comprising at least one of a document and a image is described and a parameter set which includes output parameters for setting a condition of the output process, and storing the received data file and the received parameter set into a storage area of a storage device;
  managing the received data file and the received parameter set such that the received data file and the received parameter set are linked with each other;
  identifying the received parameter set linked with the received data file, setting the condition of the output process according to the output parameters of the identified parameter set, and processing the data set of the received data file according to the output process whose condition is set by the output parameters of the identified parameter set; and
  outputting the processed data set of the received data file;
  wherein the condition of the output process is set according to the output parameters of a default parameter set which is pre-stored in the storage device, when the parameter set is not identified.

19. A program storage device readable by a computer, tangibly embodying a program of instructions executable by the computer to perform a data output method for receiving a data set input from a data source, processing the data set according to an output process, and outputting the processed data set, the method comprising the processes of:
  receiving a parameter set which includes output parameters for setting a condition of the output process, and storing the received parameter set into a first storage area formed in advance in a storage device installed in the computer;
  forming a second storage area in the storage device, and linking the formed second storage area with the received parameter set;
  receiving a data file in which the data set comprising at least one of a document and a image is described, and storing the received data file into the second storage area;

identifying the parameter set linked with the second area in which the received data file is stored, setting the condition of the output process according to the output parameters of the identified parameter set, and processing the data set of the received data file according to the output process whose condition is set by the output parameters of the identified parameter set; and outputting the processed data set of the received data file.

20. The program storage device according to claim 19, wherein, when the several different parameter sets are received in the parameter set receiving process, the several second storage areas which respectively correspond to the received several different parameter sets are formed in the storage device in the forming process, and the formed several second storage areas are respectively linked with the received several different parameter sets in the forming process.

21. The program storage device according to claim 19, wherein: the forming process comprises the process of generating link data representing a linkage between the parameter set and the second storage area, and storing the generated link data into the storage device; and the parameter set is identified by referring to the generated link data and the condition of the output process is set according to the output parameters of the identified parameter set.

22. The program storage device according to claim 19 further comprising the process of outputting a message when the parameter set that has been now received in the parameter set receiving process is the same as the parameter set that has been previously received in the parameter set receiving process.

23. The program storage device according to claim 19 further comprising the process of generating text data representing a content of the parameter set received by the parameter set receiving process, and storing the generated text data into the storage device.

24. The program storage device according to claim 19 further comprising the process of transferring the data file from the second storage area to a third storage area formed in advance in the storage device, when the processed data set of the received data file has been output by the outputting process.

25. The program storage device according to claim 24 further comprising the process of deleting the data file stored in the third storage area, when a predetermined period of time has passed since the data file was transferred to the third storage area.

26. A program storage device readable by a computer, tangibly embodying a program of instructions executable by the computer to perform a data output method for receiving a data set input from a data source, processing the data set according to an output process, and outputting the processed data set, the method comprising the processes of:

receiving a data file in which the data set comprising at least one of a document and a image is described and a parameter set which includes output parameters for setting a condition of the output process, and storing the received data file and the received parameter set into a storage area of a storage device installed in the computer;

managing the received data file and the received parameter set such that the received data file and the received parameter set are linked with each other;

identifying the received parameter set linked with the received data file, setting the condition of the output process according to the output parameters of the identified parameter set, and processing the data set of the received data file according to the output process whose condition is set by the output parameters of the identified parameter set; and outputting the processed data set of the received data file;

wherein the condition of the output process is set according to the output parameters of a default parameter set which is pre-stored in the storage device, when the parameter set is not identified.

27. The apparatus according to claim 1, wherein, the output device is connected to a plurality of the above data sources through a communication network.

28. The apparatus according to claim 10, wherein, the output device is connected to a plurality of the above data sources through a communication network.

* * * * *